United States Patent [19]

Schütte

[11] 4,325,825

[45] Apr. 20, 1982

[54] SEPARATOR

[75] Inventor: Heinz Schütte, Hofheim am Taunus, Fed. Rep. of Germany

[73] Assignee: Hoechst Aktiengesellschaft, Frankfurt am Main, Fed. Rep. of Germany

[21] Appl. No.: 143,341

[22] Filed: Apr. 24, 1980

[30] Foreign Application Priority Data

Apr. 26, 1979 [DE] Fed. Rep. of Germany ....... 2916856

[51] Int. Cl.³ ....................... B01D 21/26; B04B 11/00

[52] U.S. Cl. .................................... 210/371; 210/377; 210/378; 233/11; 233/19 A; 233/20 A; 233/29

[58] Field of Search ..................... 210/360.2, 369, 377, 210/378, 360.1, 371; 233/11, 19 A, 28, 29, 34, 20 A

[56] References Cited

U.S. PATENT DOCUMENTS

| | | | |
|---|---|---|---|
| 2,500,100 | 3/1950 | Strezynski | 233/28 |
| 3,080,109 | 3/1963 | Halbach | 233/28 |
| 3,468,475 | 9/1969 | Thylefors | 233/29 |
| 3,640,452 | 2/1972 | Thylefors | 233/19 A |
| 3,825,177 | 7/1974 | Kohlstette et al. | 233/20 A |
| 4,113,172 | 9/1978 | Pautsch et al. | 233/11 |

*Primary Examiner*—Benoit Castel

*Attorney, Agent, or Firm*—Curtis, Morris & Safford

[57] ABSTRACT

A separator for separating liquids immiscible with each other and containing solids heavier than the heavier liquid, includes a rotating conic drum into which the liquids are injected. The drum has a circumferential wall formed of two oppositely-directed conic surfaces joined at the bases at an inclination angle to form an equator; and openings are provided at the equator for the heavier liquid and the solids to pass. Preferably, the drum has a star-like cross section with the interior wall extending inward at an angle from either side of each opening. The separator can include a weir or paring disc disposed radially in the static pressure chamber at a nominal level of the heavier liquid to maintain proper pressure of the heavier fluid to prevent the lighter liquid from discharging into the static pressure chamber. Alternatively, a sensor and valve arrangement can be provided to achieve this benefit.

13 Claims, 5 Drawing Figures

SEPARATOR

BACKGROUND OF THE INVENTION

1. Field of the Invention

The present invention is directed to a separator for separating at least two liquids that are immiscible with each other and that contain solids having a higher specific weight than the heavier one of the liquids. More particularly, the present invention is directed to a separator which comprises a conic drum in which separating means are arranged and into which an inlet tube, a paring disc and an outlet tube project.

2. Description of the Prior Art

Liquids occurring in chemical processes generally have some particulate solid impurities, for example rust particles, insoluble salts, and the like, the concentration of which is in a range of a few per mill to fraction of one percent. Due to their low concentration, these solids are generally insignificant in further processing and may therefore remain suspended in the liquid without adversely affects further processing operations. However, upon the separation of liquids in a separator, these solid impurities are inevitably separated with the heavier liquid when they have a higher specific weight than the heavier one of the two liquids. Depending on the relative concentration of such solids, the separator drum is filled more or less rapidly with them, eventually inhibiting further separation of the liquids. Therefore, the separators require frequent cleaning, which cleaning requires tedious and extensive, manual work and results in a considerable decrease in the capacity of the separator.

Self-cleaning separators are known the drum of which has slots or nozzles which can be opened either manually or automatically whenever a sludge chamber thereof has filled. However, in the event that large quantities of solids are present, these separators fail to work as intended, because the solid particles bake tightly with one another during the separation operations in such a manner that they do not leave the drum when the cleaning slots are opened. The use of nozzles has been proposed for solving this problem but has not successful, because the nozzles could not control the separation process.

A further disadvantage in the state-of-the-art separators in their failure to work properly when the melting point of one or both of the components is at a certain level above room temperature. While according to other physical or physico-chemical processes these components are easy to handle in the liquid phase obtained by keeps the material above its melting point, separation by separators of these components in liquid phase has not been possible because the design of known separators does not permit them to be heatable.

OBJECTS AND SUMMARY OF THE INVENTION

It is therefore an object of the present invention to provide a separator which allows quantitative separation of two liquids that are immiscible with each other and that contain particulate solids having a higher specific weight than the heavier one of the two liquids, and which allows heating or cooling of the separation chamber thereof.

In accordance with an aspect of the invention, this object is achieved by separator in which the drum is arranged within a static pressure chamber and is provided at its equator (i.e., its portion of greatest radial extent) with openings ending in the static pressure chamber, and the static pressure chamber is provided with an adjustable withdrawal device.

According to one embodiment of the invention, the drum has a biconic circumferential wall formed of two oppositely-directed conic surfaces joined at their bases to define an equator, the wall being axially inclined from the equator at an angle that equals or exceeds the natural angle of repose of the solid particles, so that the solid particles pass through the openings with the heavier liquid, and do not remain inside the drum. The circumferential wall of the drum can also have an interior surface that gives the drum a star-shaped cross section, in which the interior surface extends inwardly from either side of each opening at an angle (preferably at least as great as the natural angle of repose) with respect to the tangent at the opening. In order to maintain heavier liquid in the static pressure chamber substantially in an equiphase rotation with the contents of the drum, the outside of the drum wall is provided with devices for entraining the heavier liquid, for example ribs or the like. For minimizing friction, the static pressure chamber may be surface-refined in its interior, for example mirror-finished. For the simultaneous discharge of the heavier liquid and the solids, the static pressure chamber is provided with a paring disc or terminal weir as withdrawal device. The weir or paring disc is arranged and the diameter thereof is chosen in such a manner that the separating zone for the two liquids is in a favorable position within the rotating drum. When the static pressure chamber has a conic shape, openings provided at its equator can serve as withdrawal devices. These openings may have valves which, if desired, are controlled by a measuring device arranged in the pressure chamber at the nominal radial level of the mixture of heavy phase and solids. For indirect cooling or heating of the separator contents, the static pressure chamber may be provided with a corresponding liquid-filled jacket. When using a conically shaped pressure chamber, the inclination angle of the walls should be also equal to or greater than the natural slope of the solids to be removed.

DETAILED DESCRIPTION OF THE PREFERRED EMBODIMENTS

Figure 1:
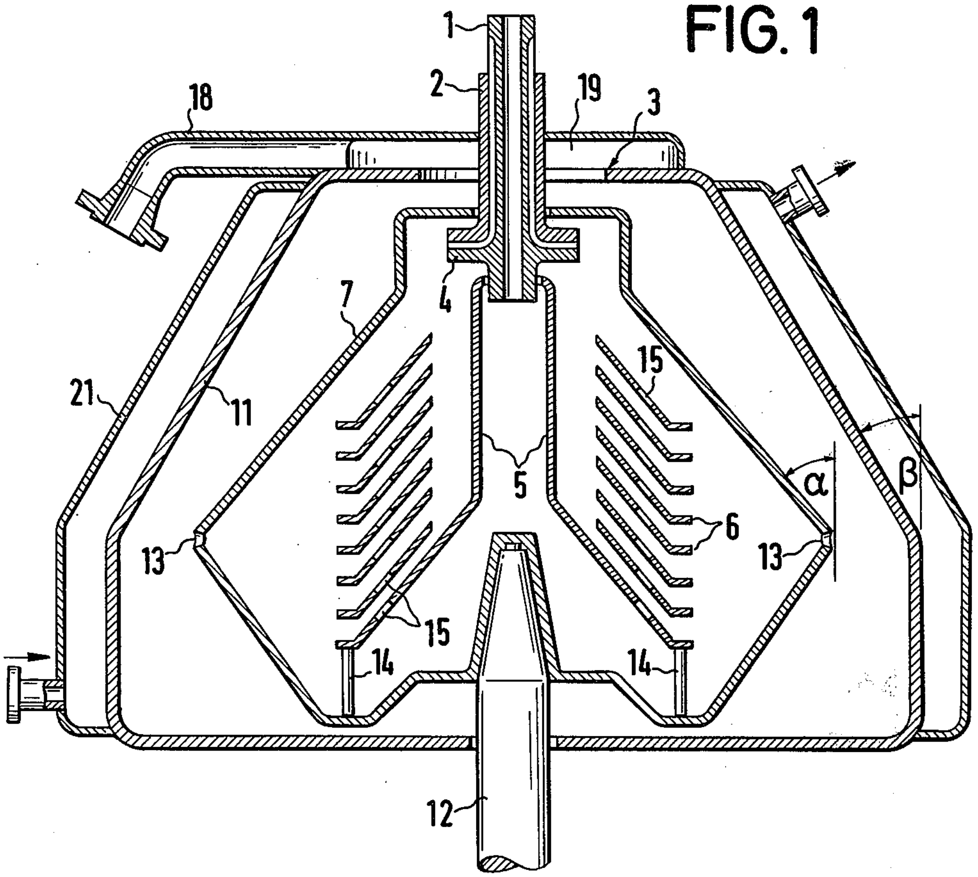
FIG. 1 is a cross sectional view of a separator according to this invention.
Figure 2:
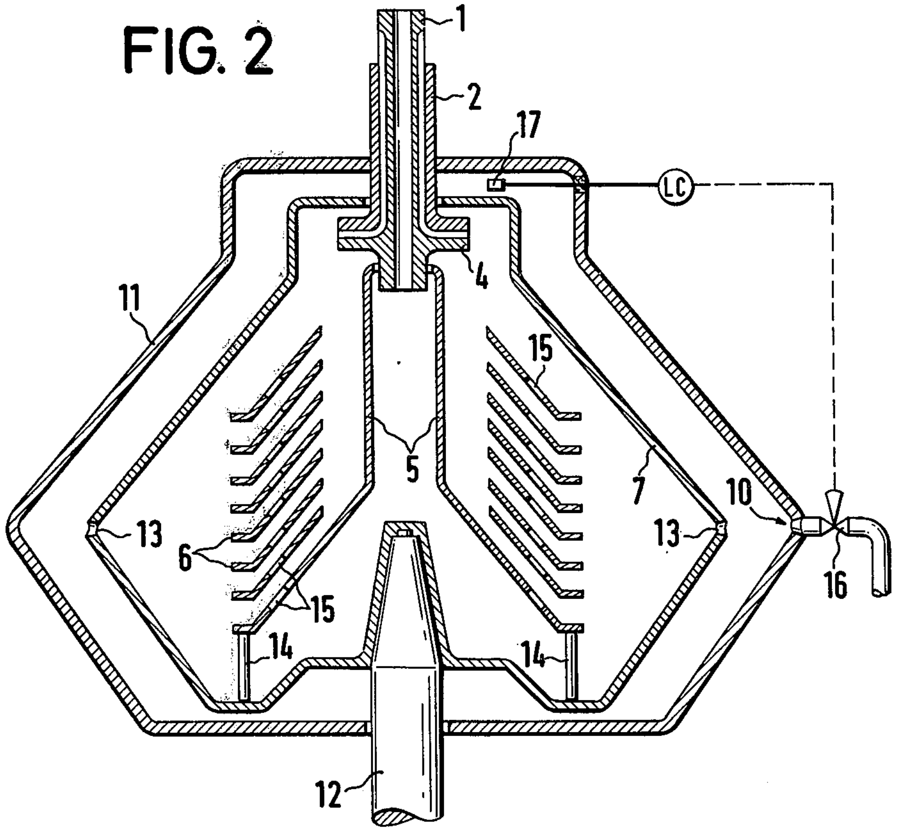
FIGS. 2 and 3 show variations of the separator of FIG. 1.
Figure 3:
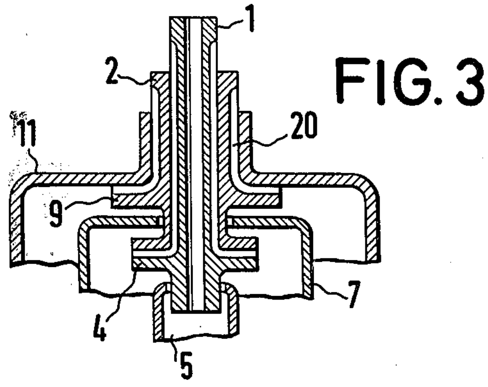
Figure 4:
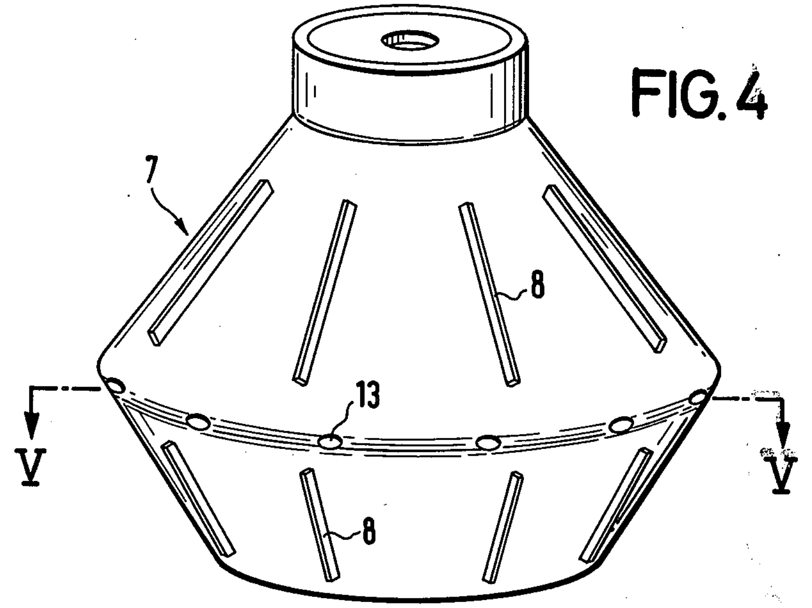
FIG. 4 is a perspective view of the biconic drum of the separator of this invention.

With reference to the drawings, FIG. 1 shows a separator having a coaxial inlet tube 1 and outlet tube 2, a weir 3 at the top of the separator, and a paring disc 4 coupled to the outlet tube 2.

Figure 5:
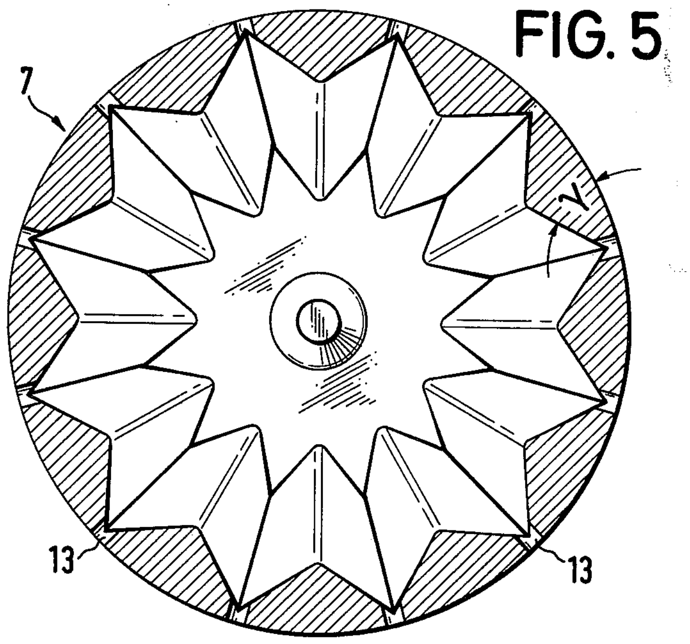
FIG. 5 is a cross-sectional view, at line V—V, of the biconic drum of FIG. 4.

The inlet tube 1 for the mixture projects into a rotating conic drum 7 of the separator provided with a separating element formed of a baffle plate 5 for guiding the entering mixture and of separating plates 6. In the drum 7, the light phase i.e., the lighter of the two liquids, is removed by means of paring disc 4 which is mounted at the end of outlet tube 2 projecting into the drum. The baffle plate 5, by means of which the mixture to be separated is distributed in the drum is connected with the drum walls via bars 14. The separating plates 6, having the shape of conic frustums, each with a large central aperture, are stacked onto the baffle plate 5 and are arranged concentrically around it. The diameter of the paring disc should be smaller than the diameter of the central apertures of separating plates 6. Baffle plate 5 and separating plates 6 are provided with recesses or perforation 15, located at approximately the radial position of the separating zone where the mixture is separated into a light liquid (phase) and a heavy liquid (phase) which possibly contains solids. The drum 7 is connected with a driving shaft 12. In order to prevent the formation of dead spaces for the solids, the drum 7 is preferably of biconic design. More specifically, as shown in cross section in FIG. 5, the drum 7 has a star-shaped interior wall with the points of the star at the location of the openings 13, that is, the interior surface extends inwardly from either side of each opening 13 at an inclination angle $\gamma$. As shown in FIG. 1, the wall of the drum 7 also extends at an inclination angle $\alpha$ from the openings 13. These inclination angles $\alpha$ and $\gamma$ of the drum walls are advantageously equal to or greater than the natural angle of repose of the solids. slope. The openings 13 provided at the equal of drum 7 lead into a static pressure chamber 11. The surface of the drum 7 may have devices, for example ribs 8, for entraining the heavy phase.

Similarly to the drum 7, the pressure chamber 11 may likewise be of conic shape and is provided with a withdrawal device for the heavy phase, which may be a weir 3, a paring disc 9 or, in the case of conic-shaped static pressure chamber 11, several openings 10 situated at the equator of chamber 11 and optionally provided with valves 16. For automatic control, the valves 16 are connected with a sensor or indicating device 17, for example a measuring device. The diameter of weir 3 or paring disc 9 should be larger than that of paring disc 4. The position of the separation zone in the drum depends on the diameter of weir 3 or paring disc 9. The inclination $\beta$ of the walls should also be equal to or greater than the natural angle of repose of the solids. When a weir 3 is used, the heavy phase is collected in a trap 19 and is drawn off via a tube 18. When using a paring disc, the heavy phase is drawn off via outlet tube 20 which is arranged concentrically to inlet tube 1. For indirect heating or cooling, the static pressure chamber 11 may be provided with a surrounding liquid heating/cooling jacket 21.

What is claimed is:

1. In separator apparatus for separating a mixture of at least two liquids that are immiscible with each other and that contains solid particles having a specific gravity greater than the heavier of the two liquids, including a rotating drum with a biconic circumferential wall formed of two oppositely-directed conic surfaces joined at the bases thereof to define an equator, the wall being axially inclined from said equator at a predetermined inclination angle equal to or greater than the natural angle of repose of said solid particles and the drum having openings at the equator thereof through which the separated heavier liquid and solid particles can pass; means for injecting said mixture into the drum; means for conducting the lighter of the separated liquids from the drum; static pressure chamber means surrounding the drum to receive the heavier liquid and solid particles and holding, during operation, a fill of said heavier liquid surrounding said drum outwardly beyond a predetermined nominal radial level; and means for conducting the heavier liquid from said static pressure chamber means; the improvement wherein said apparatus comprises means for entraining said heavier liquid in the static pressure chamber means to rotate substantially synchronously with said drum, and wherein said means for conducting the heavier liquid includes discharge means disposed at said nominal radial level for maintaining the radial level of the rotating heavier liquid in the static pressure chamber means at said nominal radial level at a predetermined distance from the axis of said drum while said heavier liquid is entrained to rotate with said drum, so that the pressure of said heavier liquid is controlled and discharging of the lighter liquid into the static pressure chamber means is prevented.

2. Separator apparatus according to claim 1, wherein the circumferential wall of said drum has an interior surface that in cross section across its axis extends inward from either side of each opening at a selected angle ($\gamma$) with respect to the tangent at such opening.

3. Separator apparatus according to either of claims 1 and 2, wherein said entraining means includes ribs provided on an exterior surface of said drum.

4. Separator apparatus according to either of claims 1 and 2, wherein said static pressure chamber means has an interior surface in contact with said heavier fluids, and such interior surface is surface-refined.

5. Separator apparatus according to either of claims 1 and 2, wherein said static pressure chamber means has a circumferential wall formed of at least one conic surface inclined at an angle to the axis thereof, with the last-mentioned angle being equal to or greater than the natural angle of repose of said solid particles.

6. Separator apparatus according to claim 3, wherein said static pressure chamber means has a circumferential wall formed of at least one conic surface inclined at an angle to the axis thereof with the last-mentioned angle being equal to or greater than the natural angle of repose of said solid particles.

7. Separator apparatus according to claim 6, wherein the circumferential wall of said static pressure chamber means is biconic.

8. Separator apparatus according to claim 7, wherein said static pressure chamber means is provided with openings at the portion of its biconic surface of greatest axial extent.

9. Separator apparatus according to claim 8, wherein said discharge means includes a valve located at the openings of said static pressure chamber means and automatic sensor means disposed in said static pressure chamber at said nominal radial level of the rotating heavier liquid in such chamber for automatically opening said valve when said nominal level is reached.

10. Separator apparatus according to either of claims 1 and 2, wherein said discharge means includes a weir radially disposed about the axis of said drum at a position corresponding to said nominal radial level of the rotating heavier fluid in said static pressure chamber means.

11. Separator apparatus according to either of claims 1 and 2, wherein said discharge means includes a paring disc having inlet means radially disposed about the axis of said drum at a position corresponding to said nominal radial level of the rotating heavier fluid in said static pressure chamber means.

12. Separator apparatus according to either of claims 1 and 2, further comprising jacket means surrounding said static pressure chamber means for maintaining said separator apparatus at a temperature different from room temperature.

13. Separator apparatus according to either of claims

1 and 2, wherein said means for conducting the lighter liquid includes a paring disc having an inlet port disposed radially inside said nominal radial level.

* * * * *